United States Patent
Ho et al.

(10) Patent No.: US 6,868,537 B1
(45) Date of Patent: Mar. 15, 2005

(54) METHOD OF GENERATING AN IC MASK USING A REDUCED DATABASE

(75) Inventors: Jonathan J. Ho, Fremont, CA (US); Xin X. Wu, Fremont, CA (US); Zicheng Gary Ling, San Jose, CA (US); Jan L. de Jong, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 126 days.

(21) Appl. No.: 10/082,991

(22) Filed: Feb. 25, 2002

(51) Int. Cl.[7] ............................................... G06F 17/50
(52) U.S. Cl. ........................... 716/19; 716/20; 716/21
(58) Field of Search ........................... 716/19, 20, 21, 716/3; 430/30

(56) References Cited

U.S. PATENT DOCUMENTS 5,879,844 A * 3/1999 Yamamoto et al. ........... 430/30
6,430,737 B1 * 8/2002 Cobb et al. ................... 716/19
2002/0026260 A1 * 2/2002 Tomita ........................ 716/21
2002/0157068 A1 * 10/2002 LaCourt et al. ................ 716/3
2002/0166109 A1 * 11/2002 Rittman et al. ............... 716/19

* cited by examiner

Primary Examiner—Thuan Do
(74) Attorney, Agent, or Firm—Lois D. Cartier

(57) ABSTRACT

For IC devices that have repeating structures, a method of generating a database for making a mask layer starts with a hierarchical database describing at least one repeating element in the layer, a skeleton that surrounds the repeating elements, and instructions as to where to locate the repeating elements within the skeleton. This database is modified to generate a database that has optical proximity correction (OPC) for diffraction of light that will pass through the mask and expose photoresist on the IC layer. The optical-proximity corrected mask database is fractured by a mask house using instructions on how the modified data base will be divided to form repeating elements that are still identical after OPC, a mask skeleton that includes non-repeating elements, and instructions for placement of the repeating elements in the skeleton. Thus the resulting mask database is smaller than a mask database that includes all copies of repeating elements.

9 Claims, 6 Drawing Sheets

US 6,868,537 B1

METHOD OF GENERATING AN IC MASK USING A REDUCED DATABASE

FIELD OF THE INVENTION

The present invention relates to making masks used for patterning layers of a semiconductor integrated circuit device and to the database for communicating the information for making the masks.

BACKGROUND

When an integrated circuit device has been designed by integrated circuit design engineers, and patterns of wires, insulation, and semiconductor material have been laid out to implement the integrated circuit device, it is necessary to pattern a set of masks to be used by a foundry to form the layers of material in the integrated circuit device. The mask patterns are typically several times larger than the patterns they will form on the IC device, and lenses reduce the pattern to the size of the IC. The information used to form each of the masks is generated and stored by a computer in electronic form. It can then be placed on a tape, compact disk, or other electronic medium to be communicated to the foundry or mask vendor and used by the foundry or mask vendor to make the successive mask layers. The design database that is stored by the computer is hierarchical, describing, for example, coordinates of lines and widths of the lines, and where the lines are to be located. This database is converted by the mask vendor or foundry to a non-hierarchical format that can be used to control an E-beam machine to write patterns on a layer of chromium or other opaque metal for making the mask. This process of converting from the design database to the mask making database is called fracturing.

In the past, a mask pattern for an entire layer of the IC has been described by data indicating where all the spaces or solid portions are to be located. As integrated circuit devices have become larger and more complex, the amount of data to describe the mask pattern has increased. Also, many large integrated circuit devices have highly repetitive structures. This repetitive nature has been taken advantage of by communicating data to the foundry or mask vendor in a format that has a hierarchy. One set of data will describe a skeleton of the entire layer, leaving blanks at locations where the repeating elements are to be located, and another set will describe the repeating elements in detail only once rather than at every occurrence. When the design data is fractured to produce the mask making database, all copies of the repeating elements must be included, so the mask making database becomes undesirably large.

Another issue must be dealt with when geometries are very small. Modern design rules may allow line widths, transistor channel lengths, and other features having dimensions on the order of 0.13 microns. The wave length of light used to expose photoresist on the IC device layer is on the order of 0.25 microns. With these dimensions, light diffraction is a significant factor and must be taken into account. Light that passes between two closely adjacent lines will diffract and spread before reaching the IC device being exposed. Thus the resulting structure will not meet design rules and will not be a reliable structure. To avoid this effect, line widths on the mask must be adjusted to compensate for diffraction so the resulting IC has the intended line widths and spacings. These diffraction adjustments are called optical proximity correction or OPC. Different portions of the mask must be adjusted different amounts because line densities of adjacent elements are not the same. There is less adjustment needed when line densities are lower.

In the case of repeating elements, line densities at the edges must be adjusted differently depending on what is adjacent to the repeating elements. If a repeating element is to be placed next to a less dense adjacent region, the optical proximity correction at the edge of the repeating element will be less than if the repeating element is placed next to a dense adjacent region. However, the process of OPC produces a database in which the repeating elements are no longer identical. Thus the benefit of storing just one copy of the repeating element is lost.

Further, when the design database is fractured to produce a mask database, all copies of the repeating elements have been included, and the mask database for a complex IC device has become extremely large. It is desirable to reduce the size of very large mask databases for these very complex IC devices.

SUMMARY OF THE INVENTION

Some mask databases have included data for more than one chip to be patterned by the single mask. In this case, the fractured mask database is hierarchical to the extent that several data files for the separate chips are provided. According to the invention, the mask database remains hierarchical after fracturing, and the repeating elements are treated in the mask database as separate chips. Thus, instead of the mask database requiring all repetitions of repeating elements, only one repetition of the repeating element is stored in the mask database. However, to account for optical proximity correction, in one embodiment, a central repeating element is generated that stays sufficiently away from the edges of an actual repeating element, that all differences in optical proximity correction occur within these edges and not in the central repeating element. Thus, the central repeating element remains truly identical in every repetition. Thus most data describing repeating elements can be stored in a mask database only once. Also stored in the mask database is a skeleton of the layer including the information about the edges of the repeating elements that are optically corrected differently from one another according to line density of their neighbors and are therefore not repeating. Thus the mask database size is significantly reduced.

The method is compatible with current practices of mask vendors that are accustomed to files for patterning multiple chips with one mask, the difference being that the repeating structures are placed directly adjacent to the skeleton so that conductive lines and other features in the skeleton actually connect to corresponding lines and features in the repeating structures.

In another embodiment useful in large repeating structures with repeating patterns, in addition to generating a central repeating element, several edge repeating elements are also generated, one for each kind of adjacent element. Each of these is separately stored in the mask database with instructions as to where it is to be placed. This allows the total memory for describing the layer to be further reduced since the central repeating element is stored only once, each type of edge element is stored only once, and the skeleton of information for the entire IC layer is smaller.

The IC device is made up of many layers, and there may be on the order of 25 masks used during the manufacturing process to pattern, etch, or implant the various layers. One large IC device has some masks that require on the order of 25 gigabytes of data to specify the pattern if data were supplied for every part of the mask without use of the invention. For this device, the data for specifying a mask was reduced from about 25 gigabytes to about 4 gigabytes. Such a reduction is clearly advantageous.

DETAILED DESCRIPTION

Figure 1:
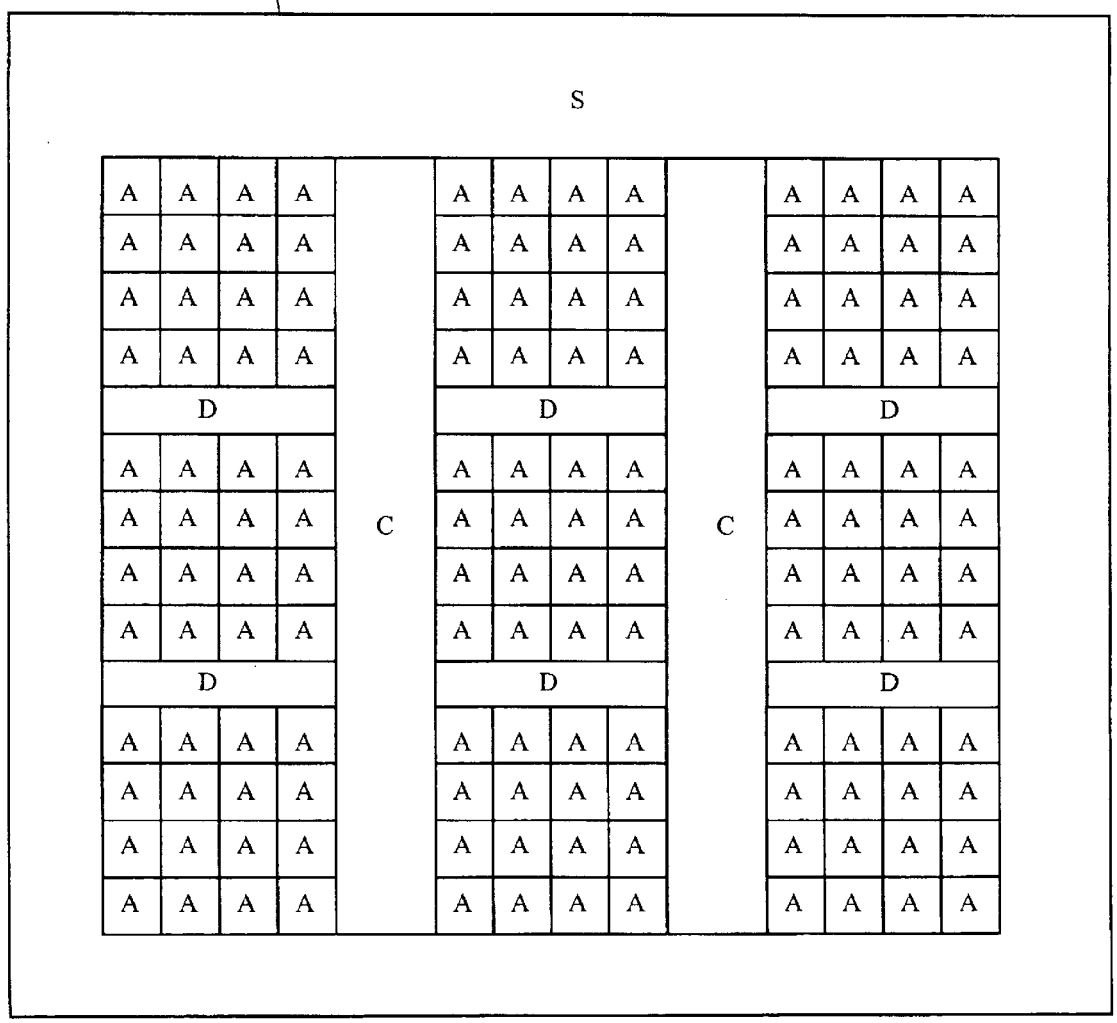
FIG. 1 illustrated a layout of an integrated circuit device, showing several repeating sections.

FIG. 1 illustrates a layout of an integrated circuit device 100, showing several repeating sections. Many integrated circuit devices have repeating sections. As shown in FIG. 1, there are five kinds of sections. The sections labeled "A" repeat many times throughout the IC device. The sections labeled "C" repeat twice, and the sections labeled "D" repeat six times. The region labeled "S" is a skeleton region that does not repeat but surrounds the repeating sections. In an actual commercial IC device, these may be any kind of circuits, but for the purpose of illustration, a field programmable gate array structure (FPGA) will be discussed. FPGAs include configurable logic blocks that repeat many times throughout the device and regions "A" can represent configurable logic blocks. Regions labeled "C" can be blocks of random access memory, buffers, interconnect structure, or frame registers for configuring the FPGA. It is only important that the two regions C have the same layouts and that they can be looked upon as repeating structures. The same is true of regions E. Skeleton region S encompasses the non-repeating portions of the IC device, and can include pads along the edge of the IC device, and other structures that do not repeat throughout the IC device.

A structure such as represented by FIG. 1 is designed by design engineers and then given to a fabrication house. The fabrication house makes the necessary optical proximity correction to achieve the particular spacings specified by the design and layout engineers. The degree of correction is based on several factors including the particular wavelength of radiation that will pass through the mask and distance between the mask and the IC to be patterned. An optically corrected mask data file is generated by the fabrication house. But this data file has not yet been fractured., That is, data is not yet in a form that can be used to actually generate the mask.

The mask is typically manufactured by a mask vendor and the mask vendor typically does the fracturing to be compatible with the E-beam controller being used. In the past, if the mask database generated by the mask vendor is too large, the mask database is "divided", which means that portions of the mask data are placed into separate files, in order to reduce the size of any one file.

It has been determined that except for an edge portion, which in some cases is on the order of 3 to 5' microns, the optical proximity corrections for all repeating elements of a type leaves the central portions of the elements identical. Therefore if the dividing is done so that the mask database repeating elements are 3 to 5 microns smaller on each side than the design database repeating elements would suggest, then a single data file can be successfully used for many copies of these smaller repeating elements.

Figure 2:
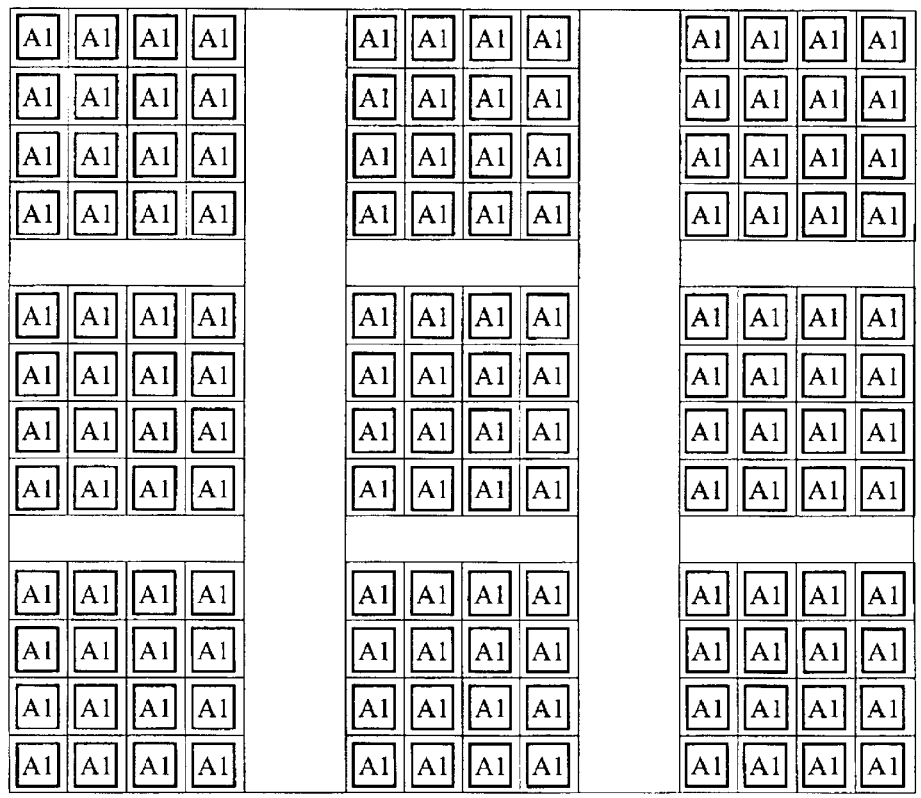
FIG. 2 illustrates a representation of the layout of FIG. 1 with dividing lines showing repeating sections selected according to the invention.

FIG. 2 shows a representation of the structure of FIG. 1 in which, according to the invention, elements A have been divided to exclude edge portions and include only the portion A1 that is identical for all elements A regardless of their neighbors. Faint lines represent the boundaries of the IC elements of FIG. 1. Bolder lines represent dividing lines in a mask database representing the IC to be manufactured. For one process using an exposure wavelength of 248 nanometers, the edge portion of a repeating element not included in the mask database repeating element is about 4 microns wide. In FIG. 2, the edge portion of each element A (FIG. 1) and all of elements C and D have been placed into the skeleton S1. Thus, the entire design is represented in the mask database by the skeleton S1, one copy of the repeating structure A1, and an instruction giving the locations at which to locate the repeating structure A1. The dividing line will typically cut through lines that are part of the design so that a portion of a line is included in the repeating structure A1 and another portion is included in the skeleton S1. But this cutting is not a problem because the precision of the numbers in the database is sufficient to distinguish a small portion of the line width.

In one embodiment, the size of the mask database needed to represent the structure of FIG. 1 is reduced by 90% compared to actually representing the device without using the mask database method of the invention.

Figure 3:
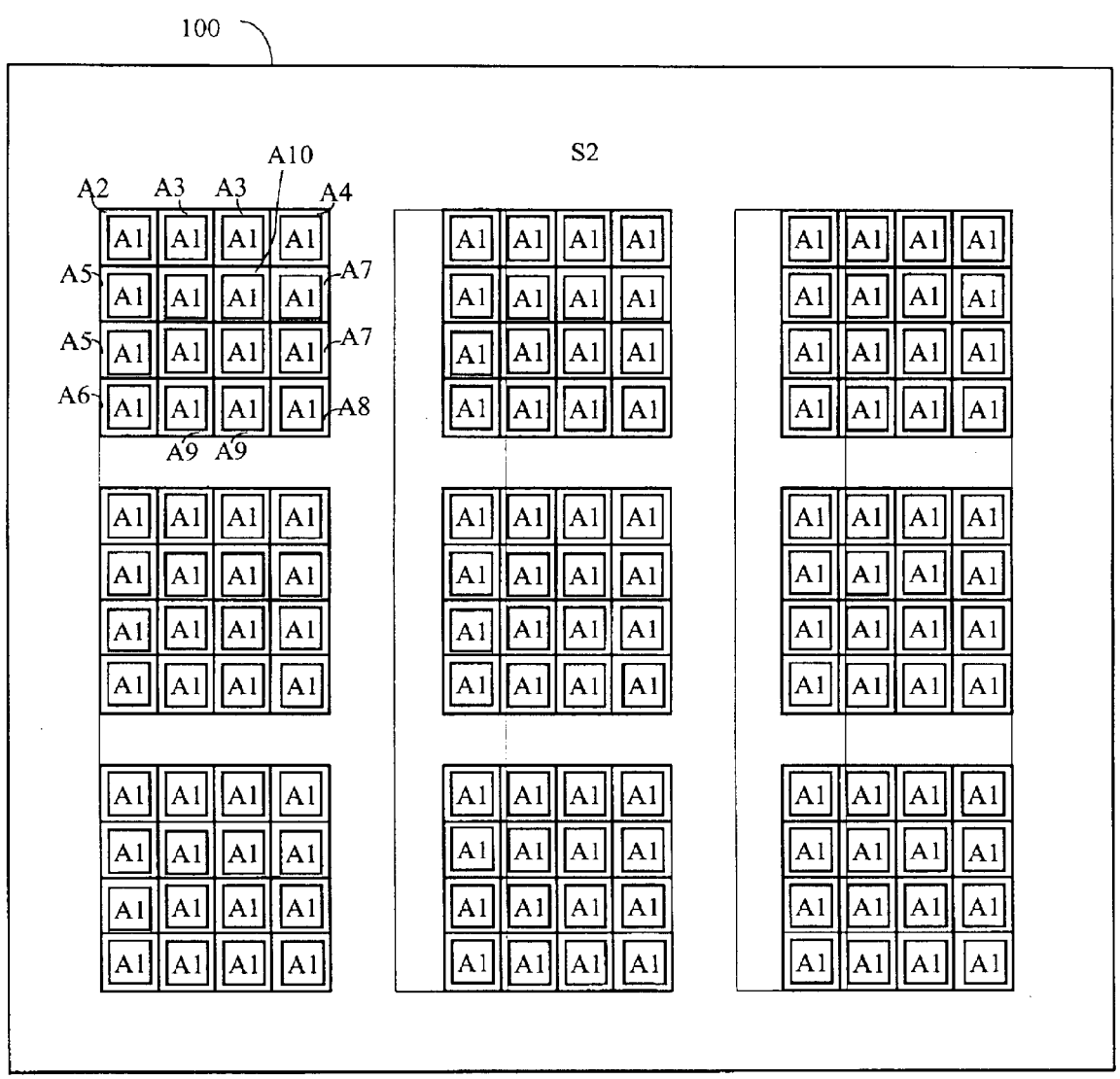
FIG. 3 illustrates another divided representation of the layout of FIG. 1 showing several kinds of repeating sections according another embodiment of the invention.

FIG. 3 shows a further dividing of the data that can achieve a further reduction in mask database size. In addition to the repeating element A1, a set of ring shaped elements surrounding elements A1 are used. In FIG. 3, there are nine kinds of ring structures A2 through A10 for the top left corner, top center, top right corner, middle left, bottom left corner, middle right, bottom right corner, and bottom center, and the four inner elements, respectively. These ring structures differ from each other by having different optical proximity correction for different adjacent elements. Inner ring A10 occurs four times but is labeled only once to avoid cluttering the drawing.

In FIG. 3, only the top left group of elements is labeled, but the same ring structures are used in all nine groups of the figure. Thus corner rings A2, A4, A6, and A8 are repeated nine times in the illustrated chip (an actual IC device may be much larger with many more repetitions), middle edge elements A3, A5, A7, and A9 are each repeated 18 times in the chip and center elements A10 are each repeated 36 times in the chip. But they are each stored only once along with a small file of instructions as to where they are to be placed. Thus the skeleton file S2 is smaller than skeleton file S1, and the total amount of data that must be stored in the mask database is also smaller.

In a variation on the embodiment of FIG. 3, rather than the nine rings surrounding the same repeating element A1, there are simply nine elements that combine the descriptions of each of the rings with element A1. Then one of the nine elements is picked and placed in the appropriate location in the mask file. This variation uses simpler instructions to the mask vendor because there are not separate files for the ring and the central element, but it requires more memory because data for the central element portion is provided nine times rather than one time.

Figure 4:
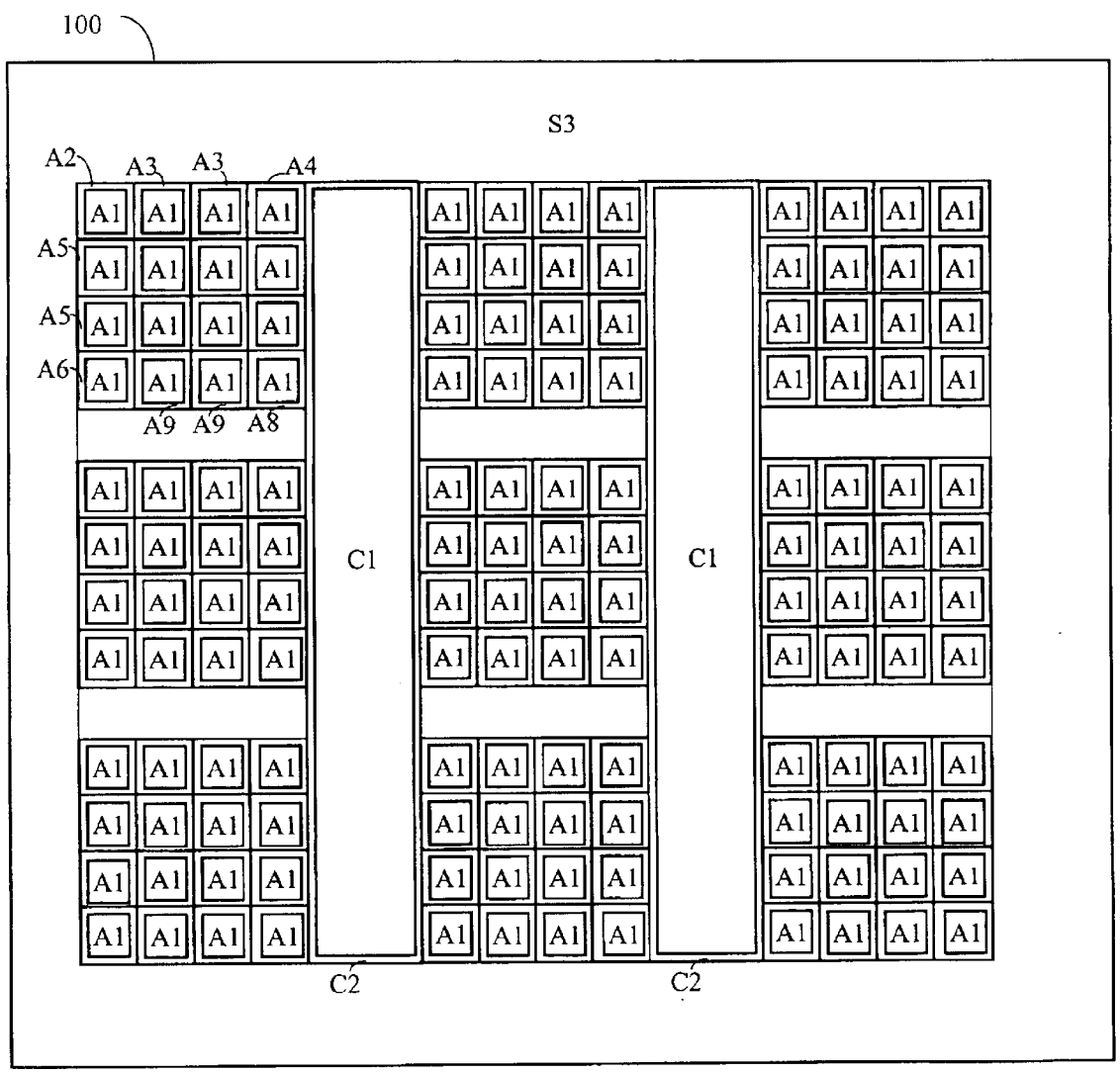
FIG. 4 illustrates yet another divided representation of the layout of FIG. 1 showing additional repeating sections according to another embodiment of the invention.

FIG. 4 shows yet another grouping of repeating structures. Here, in addition to the repeating structures shown in FIG. 3, repeating structure C1 and ring C2, which may each repeat twice in the illustration of FIG. 4, are stored once and used twice, further reducing the size of skeleton S3 in comparison to skeleton S2, thus further reducing the total size of the mask database for describing integrated circuit device 100 of FIG. 1.

Figure 5:
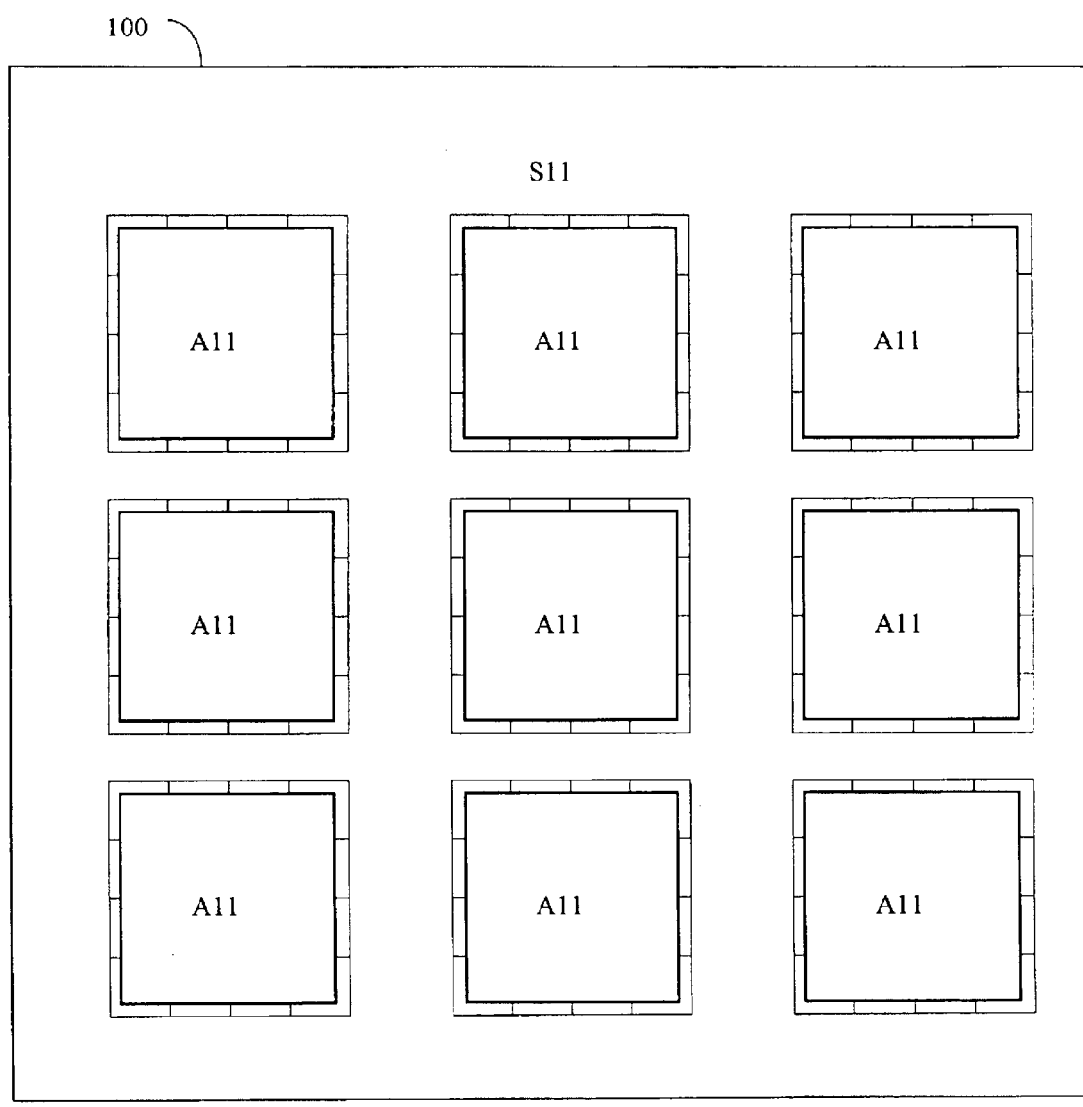
FIG. 5 illustrates yet another divided representation of the layout of FIG. 1.

FIG. 5 shows yet another dividing pattern, grouping the repeating structures into larger groups A11. This embodiment is simpler than that of FIG. 4, but also requires a larger database, because the database for describing repeating element A11 is large. But because of its simplicity, it may be preferred by certain mask houses.

FIGS. 2 through 5 illustrate that an IC device may be represented by data divided in many different patterns, all of which reduce the size of the mask database to control an E-beam writer compared to a non-hierarchical mask database, thus all offer an advantage.

A workable process for communicating information about a mask and achieving optical proximity correction may involve three companies. Integrated circuit designers at a design company generate and lay out an IC design. A complete representation of the design is then given to the foundry company that will manufacture the IC device and this foundry company modifies the layout for optical proximity correction. The modified layout is then returned to the design company or sent directly to a mask making company. The design is then fractured using the modified layout provided by the foundry company and instructions provided by the design company to create a mask data file including a skeleton, at least one repeating element, and an instruction listing locations at which the repeating element is to be placed. These steps are repeated for every layer in the IC device The mask data files may then be reviewed by the design company, after which they are sent to the foundry company to manufacture the IC device.

Figure 6:
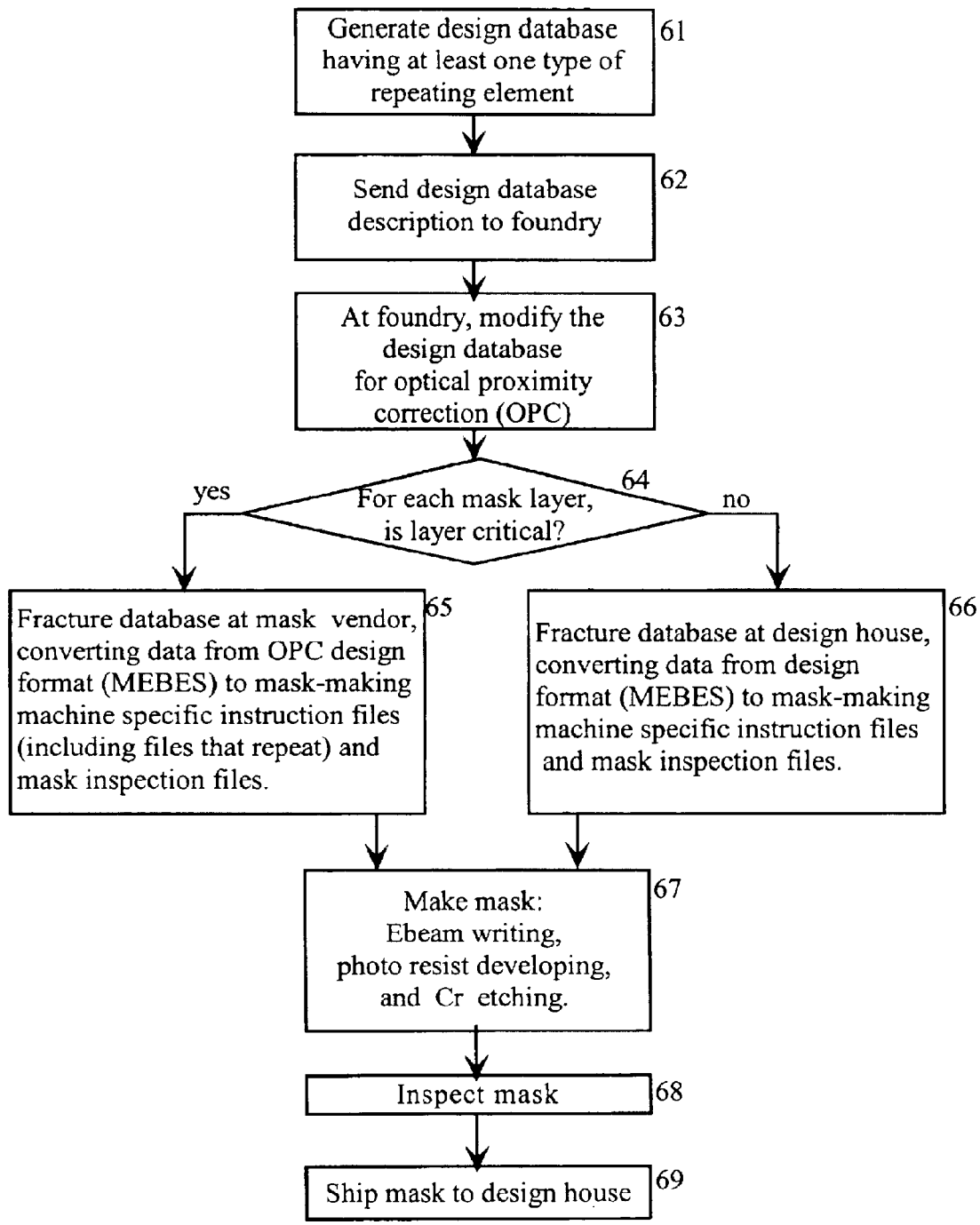
FIG. 6 shows a flow chart of steps for forming a mask layer according to one embodiment of the invention.

FIG. 6 shows a flow chart for generating a mask file according to one embodiment of the invention. In step 61, a design database is generated at the design house. This process may take months or years, and require the efforts of many engineers and mask layout designers. When this process is completed, at step 62, the design database is sent to the foundry that will make the integrated circuit devices using a set of masks made according to an aspect of the invention. At step 63, at the foundry, the design database is modified to correct for optical proximity with the knowledge of the process details to be used by the foundry in the manufacturing process.

Step 64 can produce different results for different masks in a mask set depending upon criticality. If the layer is critical (meaning density of lines is so high and feature sizes are so critical to the process window that the layer will go through the OPC process), at step 65, the design database for the layer is sent to the mask vendor with instructions for where to locate the repeating elements, and the post-OPC design database is fractured to produce mask-making machine instruction files, including at least one file that the mask-making machine will put into more than one location on the mask. If the mask layer is not critical, at step 66, the database for the layer is fractured at the design house, and mask-making machine specific instructions are generated for the layer. Non-critical mask layers may or may not include instructions for repeating elements. Typically, the file size needed to describe a non-critical layer is much smaller than that of a critical layer. Therefore, the more elaborate process of producing repeating elements may not be used. However, the process of producing repeating elements may be used in any layer where the file size for communicating with the mask vendor needs to be reduced.

Once the mask making files have been generated, the process moves to step 67, where the mask is actually formed. Mask making involves writing the pattern specified by the mask making machine instruction files on the photoresist with an electron beam (Ebeam). The photoresist is then developed, and chromium is etched away where the photoresist has been removed, resulting in the desired mask pattern. At step 68, the mask is inspected, and if acceptable, at step 69 shipped to the design house or directly to the foundry. When the foundry has the complete mask set (typically including both critical and non-critical layers) and an order for wafers to be manufactured, the foundry begins to manufacture IC devices using masks generated according to the invention.

Based on the above description, additional embodiments may become obvious to those skilled in the art, and are intended to fall within the scope of the invention as defined by the attached claims.

We claim:

1. A method for generating a mask database comprising:
   forming an IC layer data file including data describing a repeating element, data describing a skeleton into which copies of the repeating element are to be placed, and instructions as to where repeating elements are to be placed;
   modifying the IC layer data file to compensate for diffraction due to proximity of adjacent lines in the layer, thereby forming modified repeating elements, and modified data describing the skeleton;
   generating a repeating element mask data file representing a central portion of the modified repeating elements; and
   generating a skeleton mask data file representing the modified data describing the skeleton and data on edge portions of the modified repeating elements.

2. The method of claim 1 further comprising generating a mask instruction tile from the instructions as to where repeating elements are to be placed.

3. A method for generating a mask for an IC device layer comprising:
   generating a layout for the layer;
   performing an optical proximity correction for the layer to produce a mask layer database;
   identifying actual repeating elements in the layer;
   dividing the layer to form database repeating elements by making dividing lines within the actual repeating elements to exclude edge portions of the actual repeating elements;
   forming a mask layer database comprising:
   at least one database repeating element;
   a skeleton comprising data from the mask layer database not included in any of the at least one database repeating elements; and
   an instruction for inserting the at least one database repeating element into locations of the database repeating elements.

4. The method of claim 3, wherein the step of dividing the layer to form database repeating elements by making dividing lines within the actual repeating elements to exclude edge portions of the actual repeating elements further comprises:

making dividing lines at edges of the actual repeating elements to form a set of ring elements that repeat when adjacent to identical structures.

5. A mask layer database comprising:

a skeleton describing portions of the mask layer that are not repeating;

at least one database repeating element, including a central portion of a modified repeating element for describing a configurable logic block of a field programmable gate array (FPGA) or an adjoining group of configurable logic blocks of an FPGA, and a database repeating element for describing a block of RAM or group of adjoining blocks of RAM in the FPGA; and an instruction giving locations at which the at least one database repeating element is to be placed.

6. The mask layer database of claim 5, wherein the at least one database repeating element further includes a database repeating element for describing an input/output block of the FPGA.

7. A mask layer database comprising:

a skeleton describing portions of the mask layer that are not repeating;

at least one database repeating element which includes a central repeating element smaller than an actual repeating element and a set of ring repeating elements, each of which will be placed to surround one of the central repeating elements; and an instruction giving locations at which the at least one database repeating element is to be placed.

8. A method of preparing a database for making an IC device mask comprising the steps of:

at a design house, designing and laying out the IC device;

storing a layout of the IC device in electronic form;

sending the layout of the IC device in electronic form to an IC foundry;

at the foundry, generating a layout in electronic form that is optically corrected from the layout of the IC device;

at the design house, dividing the mask layout to identify a plurality of mask elements that are repeating and a skeleton of remaining elements, for the repeating mask elements creating a single database describing a repeating element and a set of instructions as to where to locate the repeating element;

at a mask house, forming a mask from the skeleton and the single database describing a repeating element located in repeating locations as specified by the set of instructions.

9. The method of preparing a database for making an IC device mask as in claim 8 wherein the mask includes lines having line widths that have been corrected for optical proximity to produce lines on an integrated circuit of a designed line width.

* * * * *